United States Patent Office 3,523,366
Patented Aug. 11, 1970

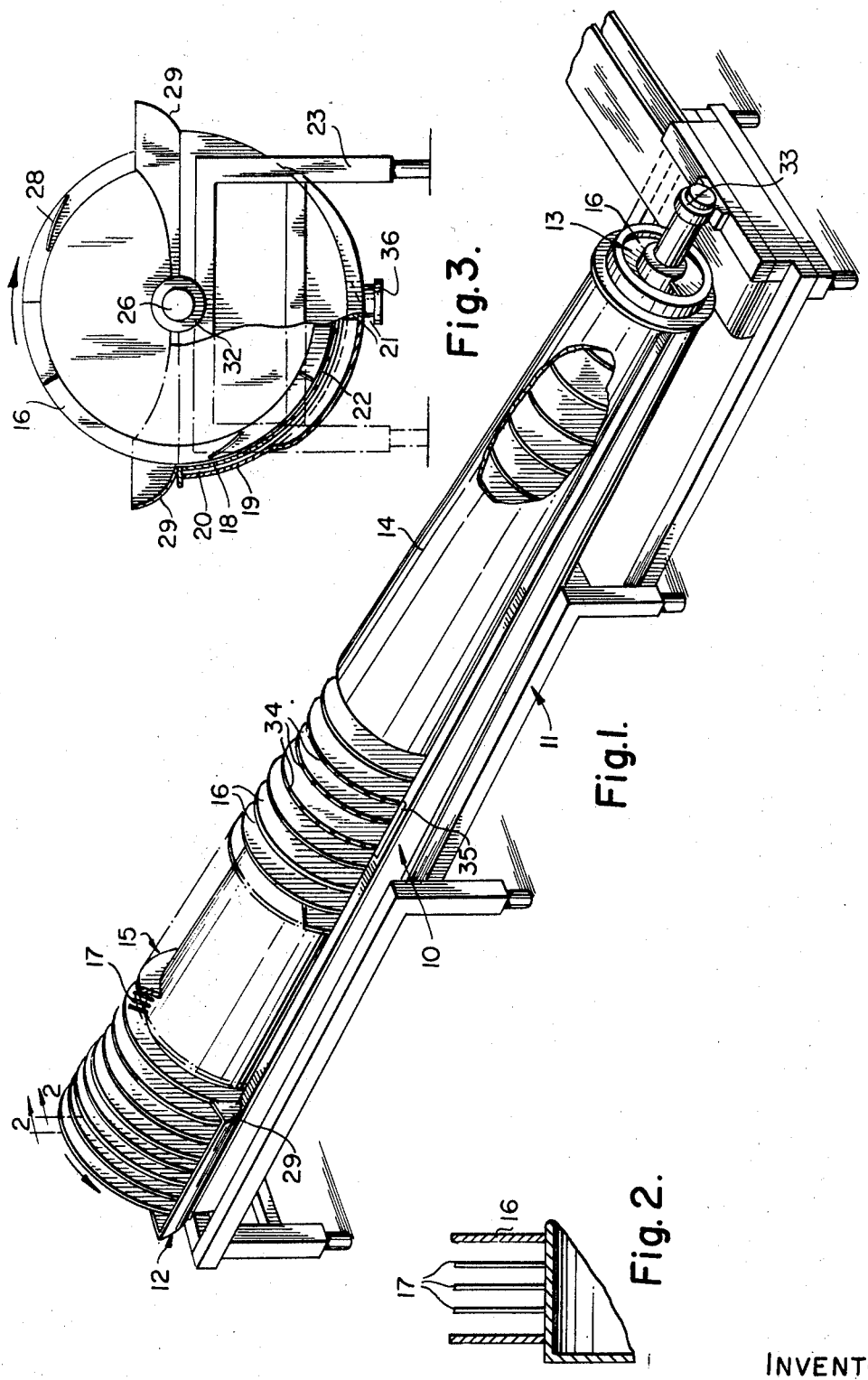

3,523,366
MACHINE FOR THE MANUFACTURING
OF CHEESE
James Edward Ross Baxter, Lunenburg, Ontario, Canada
Filed Mar. 25, 1968, Ser. No. 715,907
Claims priority, application Canada, Mar. 28, 1967,
986,330
Int. Cl. A01j 25/10
U.S. Cl. 31—46
3 Claims

ABSTRACT OF THE DISCLOSURE

The invention relates to a machine for making cheese. There is provided a tapered spiral conveyor which is rotatable in a vat and is adapted to move curds, from which the whey is being drained, along a gradually narrowing path, whereby the shape of the curd mass is changed as it is moved along the conveyor to achieve a cheddaring effect.

BACKGROUND OF THE INVENTION

This invention relates to a machine for the manufacture of cheese. In particular, the machine is intended for the manufacture of Cheddar cheese.

DESCRIPTION OF THE PRIOR ART

Cheddar cheese is most commonly made by hand, using fairly precisely defined and time-consuming methods. In view of the great popularity of this kind of cheese, machines have been designed for its mechanical production. Such a machine is disclosed, for example, in Canadian Pat. No. 743,792, granted to Commonwealth Scientific and Industrial Research Organization on Oct. 4, 1966. While the machine disclosed in this patent is capable of the manufacture of Cheddar cheese, its size and complexity make it impractical for use in all but the largest cheese-making plants. Further, its complexity makes it difficult to carry out a satisfactory cleaning operation, this being frequently necessary to meet modern standards of hygiene.

It is a further disadvantage of at least some of the known cheese-making machines that they are not continuous in operation, i.e., cheese is produced by these machines in batches and the production flow is therefore not smooth and continuous, as is desirable for co-operation with other production steps which have to be followed in the manufacture of the cheese.

SUMMARY OF THE INVENTION

It is therefore an object of this invention to provide a cheese-making machine which is of relatively simple construction and which for this reason can be produced more cheaply than known machines. It is further an object of this invention to produce a cheese-making machine which, by virtue of its simple construction, is easy to clean. It is a still further object of this invention to provide a Cheddaring machine which is continuous in operation.

Briefly stated, the present invention comprises, in a machine for the manufacture of cheese, spiral conveyor means for moving curds and whey along a gradually narrowing path and for working said curds as it moves along the path, and means for draining whey from said curds during said movement. The spiral conveyor may be formed with convolutions spaced apart a greater distance at its discharge end than at its inlet end. The path may comprise a tapered vat in which the conveyor is mounted for rotation, the conveyor being tapered to match the vat. There may be provided means for turning curds or assisting in the turning of the curds between the convolutions of the conveyor at predetermined intervals.

It should be understood that the preferred embodiment of this machine is intended to process curds and whey which have been cooked and from which the top whey has been pumped off. Further, while the machine is described in connection with the manufacture of Cheddar cheese, it will be obvious to those skilled in the art that the machine can be used for manufacturing other kinds of cheese.

As will be understood from the above, the machine of the invention comprises, in essence, only a single moving part, this being the spiral conveyor. It will be self-evident that this simplicity of construction facilitates manufacture and cleaning and reduces manufacturing costs.

DESCRIPTION OF THE DRAWINGS

The invention will now be described more fully, by way of example, with reference to the accompanying drawings, in which:

FIG. 1 is a perspective view of a Cheddaring machine according to the invention with various portions broken away to show certain features;

FIG. 2 is a partial cross-section on the lines II—II in FIG. 1, and

FIG. 3 is an end view of the machine, as would be seen from the left-hand side of FIG. 1, with the left-hand portion, as seen in the drawing, broken away.

DESCRIPTION OF THE PREFERRED EMBODIMENT

The machine shown in the drawings, and its operation, will now be described.

A vat, generally indicated at 10, is mounted on a suitable frame 11. The vat 10 is tapered from inlet end 12 to a discharge end 13. From the inlet end 12 and for approximately one-half of its length, vat 10 is open at the top, and for the remaining half of its length the vat 10 is closed by a suitable cover 14. The cover 14 is firmly, removably attached to the vat 10 by suitable fastening means (not shown).

Within the vat 10, there is rotatably mounted, on shaft 26, a tapered spiral conveyor 15. Shaft 26 is suitably journalled in bearings 32 and 33 on frame 11. The conveyor includes convolutions 16 which extend from the inlet end 12 of the machine to the outlet end 13. These convolutions 16 are spaced apart a predetermined distance at the inlet end 12, this distance to be determined according to the size of the machine.

The spacing of the convolutions 16 preferably gradually increases toward the discharge end 13, this increase being such that at the discharge end 13, the spacing is approximately double the spacing at the inlet end 12. Similarly, the width of the machine at the inlet end 12 is approximately double the width of the machine at the discharge end 13. The convolutions are mounted on a conical support 18 which is of maximum width at inlet end 12 and which tapers down to a relatively narrow width at the outlet end 13. Preferably, the taper of the conical support is such that the radial width of the convolutions at the inlet end of the conveyor 15 is approximately the same as the axial spacing of the convolutions 16 at the inlet end, the radial width increasing toward the outlet end 13 in proportion to the axial spacing; thus, the radial width of the convolutions at the outlet end is approximately double the radial width at the inlet end. The conical support may be attached to shaft 26 by any suitable means, bearing in mind the requirement for rigidity in the conveyor 15 to prevent binding between the conveyor 15 and vat 10.

There may be provided, between the first six convolutions, fingers or bars 17 for stirring curds and whey directly after their introduction to the machine.

The vat 10 is preferably of a double-walled construction, including an inner wall 18 and an outer wall 19. The space 20 between the inner wall 18 and the outer wall 19 may be used to circulate a heating or cooling fluid such as water. The inner wall 18 and the cover 14, should be closely adjacent the convolutions 16 of the conveyor 15.

Extending along the bottom of the vat 10 is a drainage trough 21 which is used to drain whey from the machine. Trough 21 communicates with the inside of the vat 10 by perforations 22 which may be in the form of narrow slits which will allow the drainage of whey without allowing the passage of curds. Vat 10 should be so mounted in frame 11 that the discharge end 13 is slightly lower than the intake end 12, thus, drainage of whey from the trough 21 is facilitated. At the lower end of trough 21 there is provided a drain pipe 36. At the inlet end 12 the drainage trough should be widened, as at 23, to facilitate rapid drainage of whey when the curds and whey are first introduced to the machine.

As is known in the Cheddaring process, it is desirable to turn ripening curds at certain intervals to allow gravity to work on the curds in different directions to remove the whey. To duplicate this turning step, selected ones of the convolutions 16 are provided with a turning device 28 which is adpated to rotate with the conveyor 15 and to facilitate turning the curds between the convolutions 16. Such turning devices are not, strictly speaking, necessary because the action of the conveyor 15 in co-operation with the vat 10 is to turn or roll the curds due to friction between the curds and the bottom of vat 10; this results in an action similar to the manual turning of curds during the conventional manual Cheddaring process. Turning devices 28 may be in the form of beads arranged on the convolutions with their leading edges radially outermost; other suitable forms will occur to those skilled in the art.

In the event that the machine is of considerable size, for example, in the order of 30 feet in length as may be desirable in a large plant, it may be necessary to provide support for conveyor 15 to prevent its downward deflection in the central portion of the vat. Since, as mentioned above, the vat 10 and the conveyor 15 are closely adjacent, even a slight deflection of the conveyor may result in binding between the conveyor 15 and the inside of the vat 10. This may be prevented by providing at least a portion of the outside of the convolutions 16 with a suitable friction resistant means, such as nylon studs 34. A portion of the inside of the vat may be formed from, or coated with, a nylon covering 35 to co-operate with the studs 34 on the conveyor 15.

The inlet end 12 of the machine may be provided with troughs 29 whereby curds and whey may be poured into the vat 10.

The operation of the device described above will now be set forth.

As is conventional in the making of cheese, rennet is added to the milk, and the resulting mixture of curds and whey is ripened, set and cooked in a conventional cheese vat. After the top whey has been removed, the curds and whey are added to the above-described machine at the inlet end 12. The mixture is placed between the convolutions 16 by means of troughs 29. The conveyor is slowly and continuously rotated by any suitable means, and curds are gradually moved toward the discharge end 13. Fingers 17 agitate the curds and whey and facilitate the drainage of the whey through the bottom of vat 10 into the widened portion 23 of trough 21. The aforementioned turning devices 28, as will be clear from the above facilitate the turning of the curds between the convolutions, although in the absence of turning devices 28 the curds will still turn. The conveyor 15 is rotated at a speed such that the curds pass through the machine from the inlet to the outlet in the appropriate time for full ripening as will be known to those skilled in the art.

It will be appreciated that the curds in between each set of convolutions, while moving through the machine, are gradually changing their shape from the relatively long, narrow strip between the convolutions at the inlet end 12 of the machine to the relatively wide, short block between the convolutions at the outlet end of the machine. Thus, as the curds pass from the inlet to the outlet of the machine, they are gently worked both by turning and by changing their shape. Whey is passing from the curds throughout this process, and by the time the curds have reached the discharge end of the machine, substantially all whey will have been removed and drained off through the drain trough 21 and drain 34.

The machine is preferably constructed from stainless steel, joints being effected wherever possible by welding to facilitate cleaning.

As has been mentioned above, the proportions of the machine are important. While the size of the machine is not critical, it may be useful to consider a typical machine suitable for use in a cheese-making plant. In such a machine, the vat could be approximately 30 feet long and 8 feet wide at the inlet end, thus the width of the vat at the outlet end would be 4 feet. It will follow that the conveyor 15 would be of similar size to the vat 10. In such a machine, the convolutions 16 would be spaced apart approximately 5 inches at the inlet end of the machine and approximately 10 inches at the outlet end of the machine, and the radial width of the convolutions would be approximately 5 inches and 10 inches at the inlet and outlet ends, respectively.

The conveyor would be rotated at approximately $12/25$ of a revolution per minute for two hours in order to effect Cheddaring.

A machine of this size should be capable of handling 20,000 lbs. of milk at 45-minute intervals, giving a daily capacity of 32 vats or 640,000 pounds of milk. Five conventional vats would be required to make the operation continuous.

It should be understood that the curds produced by the machine will require salting and pressing as is conventional in the manufacture of Cheddar cheese. Thus, conventional means for cutting the curds into strips may be provided, at the discharge end of the machine, and conveyor means may be provided to carry the curds away from the machine for the salting and pressing steps.

What I claim as my invention is:

1. A machine for the manufacture of cheese, comprising, a tapered spiral conveyor having a plurality of convolutions and being mounted for rotation in a stationary tapered vat, the vat and the conveyor having an inlet end of greater diameter than an axially opposite outlet end, the convolutions of the conveyor uniformly increasing in axial spacing from the inlet end to the outlet end and being closley adjacent the inside of the vat, and means for draining whey from the vat, whereby curds and whey introduced to the inlet end of the vat may be moved along the vat, and bodies of curd between convolutions of the conveyor are made to change their shape as they progress along the vat.

2. The machine defined in claim 1 further including means for assisting in the turning of curds passing along said conveyor between said convolutions.

3. The machine defined in claim 2, said means for turning curds comprising a bead on one of said convolutions and adapted to turn the curds adjacent said convolutions as the convolution moves through the curds.

References Cited

UNITED STATES PATENTS

| | | | |
|---|---|---|---|
| 6,422 | 5/1849 | Lockett | 17—40 |
| 705,756 | 7/1902 | Hayes | 17—40 |
| 2,260,302 | 10/1941 | Driscoll et al. | 222—413 |
| 2,693,348 | 11/1954 | Ellermann | 259—41 |
| 2,781,269 | 2/1957 | Harper | 99—116 |
| 2,840,909 | 6/1958 | Dzenis | 31—46 |
| 3,193,927 | 7/1965 | Ubbels et al. | 31—46 |

FOREIGN PATENTS 549,927 5/1932 Germany.

ALDRICH F. MEDBERY, Primary Examiner

U.S. Cl. X.R.

99—116, 243